May 29, 1951  L. M. KURTZ  2,554,992
WRIST PIN AND CONNECTING ROD ASSEMBLY
Filed Oct. 29, 1948
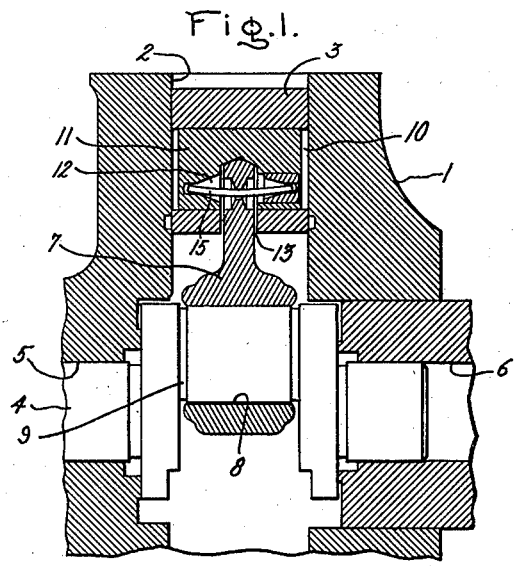
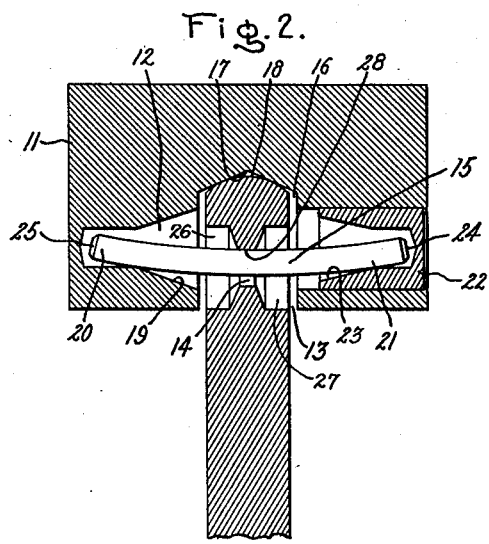
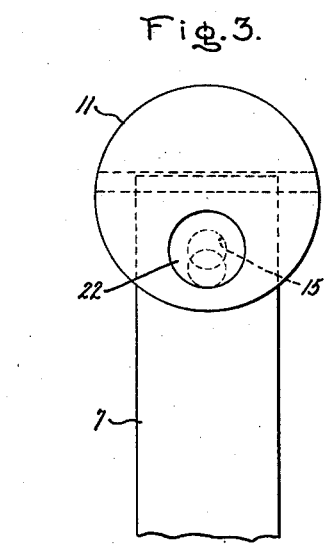
Inventor
Lowell M. Kurtz,
by *William G. Edwards, Jr.*
His Attorney.

Patented May 29, 1951

2,554,992

UNITED STATES PATENT OFFICE 2,554,992

WRIST PIN AND CONNECTING ROD ASSEMBLY

Lowell M. Kurtz, Erie, Pa., assignor to General Electric Company, a corporation of New York Application October 29, 1948, Serial No. 57,343

10 Claims. (Cl. 309—19)

My invention relates to compressors or the like and more particularly to a self-aligning wrist pin and connecting rod assembly for such apparatus.

It is an object of my invention to provide an improved wrist pin and connecting rod construction in which the parts are easily assembled and are self-aligning.

Further objects and advantages of my invention will become apparent as the following description proceeds and the features of novelty which characterize my invention will be pointed out with particularity in the claims annexed to and forming part of this specification.

For a better understanding of my invention reference may be had to the accompanying drawing in which Fig. 1 is a sectional elevation view of a portion of a compressor incorporating my invention; Fig. 2 is an enlarged sectional view of a portion of the apparatus shown in Fig. 1; and Fig. 3 is a side elevation view of the portion shown in Fig. 2.

Referring to Fig. 1, there is shown a compressor which may be used, for example, in a refrigerating system. The compressor includes a frame 1 having a cylinder 2, within which is received a reciprocating piston 3. The compressor may be driven by a motor (not shown) connected to the crankshaft 4. The crankshaft is mounted in suitable bearings 5 and 6. Power is transmitted from the crankshaft to the piston through a connecting rod 7 which is mounted on a bearing 8 provided on the crank arm 9.

Because of manufacturing tolerances there may be a slight variation in the various parts which make up the complete assembly and the wrist pin may not always be exactly parallel with the crank arm. It is accordingly desirable to provide for self-alignment in order to overcome any adverse effect of such variations. In order to provide for self-alignment between the connecting rod and the piston, the wrist pin and connecting rod assembly illustrated in detail in Fig. 2 is employed. The piston 3 includes a lateral passage 10 within which is received a wrist pin 11. The wrist pin 11 is constructed with an elongated recess 12 extending longitudinally of the wrist pin near the lower portion of the wrist pin. A passage 13 extends downwardly from the recess 12 through the bottom of the wrist pin for receiving the upper end of the connecting rod 7. The connecting rod passes through the passage 13 and is received within the recess 12, the connecting rod extending transversely of this recess.

The upper end of the connecting rod is provided with an opening 14. This opening is in general registry with the recess 12 but, in the assembled position of the connecting rod, is displaced below the center line of the elongated recess 12. In order to retain the wrist pin and the connecting rod in engagement a pin 15 extends longitudinally within the recess 12 and passes through the opening 14.

In order to assist in securing self-alignment of the connecting rod and wrist pin assembly a second recess 16 is provided within the wrist pin 11, this recess extending laterally upward from the elongated recess 12 and being located generally in line with the passage 13. The closed end or top of the recess 16 is formed in a V-shaped cross section, as indicated by 17, and the top 18 of the connecting rod which is adapted to engage the bottom 17 of the recess is curved so as to allow for self-aligning movement of the connecting rod relative to the wrist pin. Although the top of the recess 16 is shown as V-shaped in cross section, it will be apparent that this surface could be cylindrical to match the top surface 18 of the connecting rod.

In order to maintain the connecting rod and wrist pin in engagement along the adjacent surfaces 17 and 18, a construction is provided for bowing the pin 15 and placing the pin under stress. To effect this result, the lefthand end of the elongated recess 12 is tapered as indicated by 19 to provide an inclined surface. One end 20 of the pin 15 is arranged to engage the inclined surface 19 in the assembled position. In order to engage the opposite end 21 of the pin 15 and to impart the bowed shape to the pin a plug or cam member 22 is provided. This plug is forced into position within the open end of the recess 12 and may be peened or otherwise secured to the wrist pin 11. The plug 22 is generally hollow and is provided internally with an inclined or tapered surface 23.

In assembling, the connecting rod is first placed with its upper end extending transversely into the elongated recess 12 and with the surfaces 17 and 18 in engagement. The pin 15 is then inserted into the elongated recess 12 and through the opening 14 in the connecting rod, the end 20 of the pin riding up on the inclined surface 19. The plug 22 is then inserted within the elongated recess 12, the lower end of the inclined surface 23 of the plug being inserted beneath the end 21 of the pin. To facilitate insertion of the lower end of the inclined surface 23 of the plug beneath the end of the pin 15, the end 21 of the pin is chamfered, as indicated by 24. If desired, the other end 20 at the pin may be similarly chamfered, as indicated by 25. As the plug is forced into the position shown in Fig. 2, the end 21 of the pin gradually rides up the inclined surface 23 and a resulting bowing is imparted to the pin 15. This places the pin under stress and causes the pin to maintain the adjacent surfaces 17 and 18 of the wrist pin and connecting rod respectively in firm engagement. The pin 15 is preferably stressed beyond its elastic limit so that the stress in the pin in the assembled position may be uniform regardless of variations in manufacture. In lieu of inserting the pin 15 and then forcing the inclined surfaces 23 of plug under the end 21 of the pin, the end 21 of the pin may first be placed within the plug 22 and then the end 20 passed through the opening 14 and into engagement with the inclined surface 19.

In order to further facilitate self-alignment, the connecting rod is recessed, as indicated by 26 and 27, to provide a surface 28 of relatively small width for engagement with the pin 15. This surface is preferably curved or chamfered to further facilitate the self-alignment.

The elongated recess 12 in the wrist pin may be formed by drilling from the righthand end of the wrist pin, as viewed in Fig. 2. The inclined surface 19 at the lefthand end of the recess can be readily provided by a suitable tapered drill. However, it is obvious that, if desired, a cylindrical passage may be drilled entirely through the wrist pin, and a plug similar to plug 22 may be provided at the left end.

It will be noted that in the construction described, the top of the connecting rod is received within the wrist pin and does not extend beyond the top surface of the wrist pin. Accordingly, the top surface of the wrist pin is enabled to engage the cooperating surface of the passage 10 in the piston throughout the length of the wrist pin, thereby reducing the load per square inch on the wrist pin and affording longer wearing qualities.

While I have shown and described a specific embodiment of my invention, I do not desire my invention to be limited to the particular construction shown and I intend, by the appended claims, to cover all modifications within the spirit and scope of my invention.

What I claim as new and desire to secure by Letters Patent of the United States is:

1. A wrist pin and connecting rod assembly including a wrist pin having an elongated recess therein, a connecting rod having one end extending transversely into said recess, said connecting rod having an opening therein, a pin disposed within said recess and extending through said opening, and a cam member forced into position within one end of said recess for engaging one end of said pin, said pin being forced into bowed shape by said cam member whereby said pin is placed under stress to retain said wrist pin and said connecting rod in engagement.

2. A wrist pin and connecting rod assembly including a wrist pin having an elongated recess therein, a connecting rod having one end extending transversely into said recess, said connecting rod having an opening therein, a pin disposed within said recess and extending through said opening, and a cam member forced into position within one end of said recess for engaging one end of said pin, said pin being forced into bowed shape by said cam member whereby said pin is placed under stress to retain said wrist pin and said connecting rod in engagement, said pin being stressed beyond its elastic limit.

3. A wrist pin and connecting rod assembly including a wrist pin having an elongated recess therein, a connecting rod having one end extending transversely into said recess, said connecting rod having an opening therein, a pin disposed within said recess and extending through said opening, and a plug forced into position within one end of said recess, said plug having an internal inclined surface for engaging one end of said pin, said pin being forced into bowed shape by engagement with said inclined surface whereby said pin is placed under stress to retain said wrist pin and said connecting rod in engagement.

4. A wrist pin and connecting rod assembly including a wrist pin having an elongated recess therein, a connecting rod having one end extending transversely into said recess, said connecting rod having an opening therein, a pin disposed within said recess and extending through said opening, and a plug forced into position within one end of said recess, said plug having an internal inclined surface for engaging one end of said pin, said pin being forced into bowed shape by engagement with said inclined surface whereby said pin is placed under stress to retain said wrist pin and said connecting rod in engagement, said pin being stressed beyond its elastic limit.

5. A wrist pin and connecting rod assembly including a wrist pin having an elongated recess therein, said recess having an open end, a connecting rod having one end extending transversely into said recess, said connecting rod having an opening therein, said opening being in registry with said elongated recess but displaced from the center line thereof, a pin disposed within said recess and extending through said opening, and a cam member forced into position within said open end of said recess for engaging one end of said pin, said pin being forced into bowed shape by said cam member whereby said pin is placed under stress to retain said wrist pin and said connecting rod in engagement.

6. A wrist pin and connecting rod assembly including a wrist pin having an elongated recess therein, said recess having a closed end and being provided with an inclined surface adjacent said closed end, a connecting rod having one end extending transversely into said recess, said connecting rod having an opening therein, a pin disposed within said recess and extending through said opening, one end of said pin engaging said inclined surface, said recess having an open end, and a cam member forced into position within said open end of said recess for engaging the other end of said pin, said pin being forced into bowed shape by engagement with said inclined surface and said cam member whereby said pin is placed under stress to retain said wrist pin and said connecting rod in engagement.

7. A wrist pin and connecting rod assembly including a wrist pin having an elongated recess therein, said recess having a closed end and being provided with an inclined surface adjacent said closed end, a connecting rod having one end extending transversely into said recess, said connecting rod having an opening therein, a pin disposed within said recess and extending through said opening, one end of said pin engaging said inclined surface, said recess having an open end, and a plug forced into position within said open end of said recess, said plug having an internal inclined surface, one end of said pin engaging said inclined surface of said recess and the other end of said pin engaging said inclined surface of said plug, said pin being forced into bowed shape by engagement with said inclined surfaces whereby said pin is placed under stress to retain said wrist pin and said connecting rod in engagement.

8. A wrist pin and connecting rod assembly including a wrist pin having a longitudinal elongated recess therein, said recess having a closed end, said closed end of said recess being tapered to provide an inclined surface, a connecting rod having one end extending transversely into said recess, said connecting rod having an opening therein in registry with said recess but displaced from the center line thereof, a pin disposed within said recess and extending through said opening, one end of said pin engaging said inclined surface, said recess having an open end, and a plug for closing said open end of said recess, said plug having an internal inclined surface for engaging the other end of said pin, said pin being forced into bowed shape by engagement with said inclined surfaces whereby said pin is placed under stress to retain said wrist pin and said connecting rod in self-aligning engagement.

9. A self-aligning wrist pin and connecting rod assembly including a wrist pin having a longitudinal elongated recess therein, a second recess in said wrist pin extending laterally from said elongated recess, the end of said second recess being V-shaped in cross section in a vertical plane extending through the axis of said wrist pin, a connecting rod extending transversely of said elongated recess and having its end in engagement with said V-shaped end of said second recess, said end of said connecting rod having a curved surface to facilitate self-alignment, said connecting rod having an opening therethrough, said opening being in registry with said elongated recess but displaced from the center line thereof, a pin disposed within said elongated recess and extending through said opening, and a cam member forced into position within one end of said elongated recess for engaging one end of said pin, said pin being forced into bowed shape by said cam member whereby said pin is placed under stress to retain said wrist pin and said connecting rod in engagement.

10. A self-aligning wrist pin and connecting rod assembly including a wrist pin having a longitudinal elongated recess therein, a second recess in said wrist pin extending laterally from said elongated recess, a connecting rod extending transversely of said elongated recess and having its end extending into said second recess, said end of said connecting rod having a curved surface to facilitate self-aligning engagement with said second recess, said connecting rod having an opening therethrough, said opening being in registry with said elongated recess but displaced from the center line thereof, a pin disposed within said elongated recess and extending through said opening, the surface of said connecting rod adjacent said opening being curved to facilitate self-alignment of said connecting rod and said wrist pin, and cam member forced into position within one end of said recess for engaging one end of said pin, said pin being forced into bowed shape by said cam member whereby said pin is placed under stress to retain said wrist pin and said connecting rod in engagement.

LOWELL M. KURTZ.

REFERENCES CITED

The following references are of record in the file of this patent:

UNITED STATES PATENTS

| Number | Name | Date |
|---|---|---|
| 1,480,185 | Setter | Jan. 8, 1924 |
| 1,921,607 | Curtis | Aug. 8, 1933 |